United States Patent
Inoue et al.

(10) Patent No.: US 6,881,303 B2
(45) Date of Patent: Apr. 19, 2005

(54) METHOD AND SYSTEM FOR PYROLYZING PLASTIC AND PYROLYSATE PRODUCT (75) Inventors: Yoji Inoue, Zama (JP); Satoru Aikawa, Tokyo (JP); Norihiro Inagaki, Hamamatsu (JP); Shigeru Tasaka, Shizuoka (JP)

(73) Assignee: Tokyo Ertec Co., Ltd., Tokyo (JP)

( * ) Notice: Subject to any disclaimer, the term of this patent is extended or adjusted under 35 U.S.C. 154(b) by 798 days.

(21) Appl. No.: 09/793,879

(22) Filed: Feb. 28, 2001

(65) Prior Publication Data

US 2003/0196883 A1 Oct. 23, 2003

(30) Foreign Application Priority Data

Feb. 29, 2000 (JP) ........................................ 2000-053081

(51) Int. Cl.[7] .............................. C10G 1/10; B09B 3/00; C08J 11/12
(52) U.S. Cl. ............................... 201/2.5; 201/4; 201/21; 201/23; 201/33; 196/46; 196/98
(58) Field of Search ................................ 201/2.5, 4, 21, 201/23, 33; 196/46, 98; 208/3, 40, 146; 585/241

(56) References Cited

U.S. PATENT DOCUMENTS

| | | | | |
|---|---|---|---|---|
| 3,984,288 A | * | 10/1976 | Yoshida et al. ............ | 201/2.5 |
| 5,464,602 A | * | 11/1995 | Evans et al. ............... | 423/488 |
| 5,801,204 A | * | 9/1998 | Johanssson et al. ......... | 521/41 |
| 5,841,011 A | * | 11/1998 | Hashimoto et al. ......... | 585/241 |
| 5,894,012 A | * | 4/1999 | Denison .................... | 422/150 |
| 5,905,095 A | | 5/1999 | Adkins | |
| 6,011,187 A | * | 1/2000 | Horizoe et al. ............ | 585/241 |
| 6,172,271 B1 | * | 1/2001 | Horizoe et al. ............ | 585/241 |
| 6,527,430 B1 | * | 3/2003 | Osborn ....................... | 366/97 |

FOREIGN PATENT DOCUMENTS

| | | |
|---|---|---|
| DE | 1 123 102 | 2/1962 |
| DE | 1 141 784 | 12/1962 |
| JP | 10-279953 | * 10/1998 |
| JP | 11-166184 | * 6/1999 |
| JP | 2003-193064 | * 7/2003 |
| JP | 2003-231886 | * 8/2003 |
| WO | WO 97/48761 | 12/1997 |
| WO | WO 99/09092 | 2/1999 |

* cited by examiner

*Primary Examiner*—N. Bhat
(74) *Attorney, Agent, or Firm*—Oblon, Spivak, McClelland, Maier & Neustadt, P.C.

(57) ABSTRACT

A plastic as a material to be treated and an additive such as unsaturated fatty acid oil are mixed, and the mixture is heated in a pyrolysis tank at a temperature of 300° C. to 450° C. by a heating member to thereby thermally decompose the mixture. A gas component produced during the heating process is then removed and a pyrolysate is thus produced.

26 Claims, 7 Drawing Sheets

FIG. 7

METHOD AND SYSTEM FOR PYROLYZING PLASTIC AND PYROLYSATE PRODUCT

BACKGROUND OF THE PRIOR ART

The present invention relates to a method of pyrolyzing (thermally decomposing) plastics, wastes containing the plastics, and macromolecular substances such as rubbers and also relates to a system or an apparatus therefore and to a pyrolysate (product) obtained by such method and system.

In order to recycle the plastic effectively, a practical method of thermal decomposition and reduction to oil under a non-oxygen environment has been developed and implemented fractionally. This method recycles the plastics that are macromolecular petrochemicals and these molecules are oligomoleculized as an oil product through the pyrolysis process to be reusable as a liquid fuel.

In order to make the property of synthesized oil product effective, it is a common practice to use a catalyst like synthetic zeolite and metals for catalytic reforming of the oil product.

Due to different kinds of plastics and mixed materials, it was hard to keep the constant quality level of oil products because the oil products, which were derived through the above-mentioned plastic thermal decomposition method, varied in the chemical properties and components depending on every kind of material plastics and materials being mixed.

Furthermore, in a method to refine the quality of the oil products using a typical catalyst such as the synthetic zeolite, it is hard to synthesize the oil products of kerosene and light oil even though the oil products are refined after the thermal decomposition. This means that it is infeasible to keep the quality chemical properties of the products and the stable components. Therefore, most of the products are burnt for the sake of direct heating source using a burner.

The method for refining the chemical properties of oil products based upon the catalysis provides a problem of an expensive running cost and a health hazard incurred by poisoning with mixed foreign matters.

Furthermore, the oil products are susceptible to change in the chemical property for the long run. They are usually classified in Japan as the forth class of dangerous material of the first type of oil product and handled as dangerous materials. Such oil products are subjected to Japanese government regulations. Their usage and stock pilling are also subjected to the restrictions. These regulations and the restrictions have caused problems of handling and operation of the products.

SUMMARY OF THE INVENTION

An object of the present invention is to substantially eliminate defects or drawbacks encountered in the prior art mentioned above and to provide method and system or apparatus for pyrolyzing plastics and the like capable of being operated easily and safely with reduced cost while keeping quality of chemical properties for oil products being synthesized high.

Another object of the present invention is to provide a pyrolysate product which is obtained by the method and system mentioned above and which can be directly re-used as a recycle material without effecting a refinement to the product.

The inventors invented, after their research, the method of the thermal decomposition of the plastic, not just for oilization, but to obtain a pyrolysate similar to oil-asphalt that can be used as recycle materials for constructing roads and bridges. This method of the thermal decomposition is different from the oilization that distils molecules for oligo-moleculization after a thermal decomposition process but it melts the plastics to the extent that the oligomolecules are within the certain limitation of molecule weight after the oligomoleculization for the use of substituting oil asphalt. According to this method, it can be allowed to throw the plastics into the system or apparatus with foreign particles to melt them. The method can also extract viable and practical materials derived from components of the pyrolysate that is used to be waste.

The oil obtained from the oilization of the thermal decomposition, the volume of which is 10 to 30% of the plastic thrown into the system or facility, is used itself as the fuel consumed within the system and not to be discharged therefrom. The invented system derives synthetic asphalt in return for only the plastic that is thrown into it and the system shall never discharge the waste.

The asphaltization according to this method is a viable way of material recycling. The method, however, depends basically on a pyrolysis process. The heating temperature of decomposition and a chemical reaction time give large influence to the pyrolysate property. Therefore, it is difficult to control the chemical quality of the pyrolysate. The difficulty enforces the inventors to find an optimal pyrolysis process by changing and improving operational conditions, this means shortening of the process time while increasing the volume of the plastic to be processed and changing specifications of the asphalt product quality conforming to various uses. The inventors have overcome the difficulty mentioned above and provided the present invention by conducting several researches.

The above and other objects can be achieved according to the present invention by providing, in one aspect, a method of pyrolyzing a plastic comprising the steps of:

preparing a mixture of a plastic as material to be treated and an unsaturated fatty acid oil as an additive;

heating the mixture at a temperature of 300° C. to 450° C. to thereby thermally decompose the mixture; and removing a gas component produced in the heating process of the plastic.

In preferred embodiments of the above aspect, the method further comprises a step of melting the mixture before the heating process at a temperature lower than the temperature for the thermal decomposition by 50° C. to 100° C., and may further comprises a step of blowing an oxygen or a gas including an oxygen into the plastic in a melted liquid state.

An agent for accelerating an oxidization composed of a metal salt naphthenate, a metal salt fatty acid or other metal salt organic acid is added during the thermally decomposing step or melting step.

A pyrolysate in liquid or solid state obtained through the thermally decomposing process or melting is recovered as a substitution for oil asphalts or as an additive to oil asphalts.

The unsaturated fatty acid oil as the additive is added by 5–100 weight % with respect to the material plastic of 100 weight %. The unsaturated fatty acid oil has an iodine value of more than 80.

The gas component generated at the gas component removing process is cooled and liquified to thereby recover the gas component as fuel oil. A natural rubber, a synthetic rubber or another organic macromolecule is used as a material other than the plastic.

In another aspect of the present invention, a pyrolysate is manufactured by the method of pyrolyzing a plastic mentioned above.

In a further aspect of the present invention, there is also provided a system for pyrolyzing a plastic comprising:

a pyrolysis tank;

a material charging means for charging a plastic as material to be treated into the pyrolysis tank;

a supply means for supplying an unsaturated fatty acid oil as an additive to the pyrolysis tank;

a heating means for heating the pyrolysis tank; and a gas component removing means for removing a gas component generated during the heating process from the pyrolysis tank.

There is also provided a system for pyrolyzing a plastic comprising:

a melting and mixing tank;

a material charging means for charging a plastic as a material to be treated into the melting and mixing tank;

a supply means for supplying an unsaturated fatty acid oil as an additive to the melting and mixing tank, in which the plastic and the additive are melted and mixed;

a pyrolysis tank for thermally decomposing a melted product fed from the melting and mixing tank;

an evaporator provided for removing a gas component of the thermally decomposed pyrolysate induced from the pyrolysis tank;

a heating means for heating the melting and mixing tank, the pyrolysis tank and the evaporator; and a discharging means for removing and discharging the gas component generated through the heating process.

In the above systems, there may be further disposed an air supply means for blowing oxygen or a gas containing oxygen into a liquid phase of a melted product and a pyrolysate in the pyrolysis tank and the melting and mixing tank.

According to the above various aspects and their preferred embodiments, the following functions and effects can be attained or realized.

In general, there are two types of the thermal decomposition of plastic. The first type is a random decomposition of which scission of a polyethylene (PE) chain occurs at random at any portion of the chain. On the other hand, the second type is a depolymerization reaction that is an inverted growth reaction of polymerization occurring at an end of a molecular chain or a weak bond of a polymethyl methacrylate (PMM) and a polystyrene (PS). Either the random decomposition or the reaction of depolymerization case, the molecular-weight distribution of the thermally decomposed oil products obtained through the pyrolysis process is widely distributed. Therefore, it is difficult to use the obtained oil products with being untouched. The present invention, however, makes it possible to narrow the region of the molecular-weight distribution to the range of MW 2000 to 10000 and also makes it possible to derive a constant quality of the thermally decomposed oil products.

In concrete terms, the unsaturated fatty acid oil that contains fatty ester components usually found in vegetable oils is added as the additive (addition agent) into the pyrolyzing system. The unsaturated fatty acid glyceride contained in the additive in the lower temperature region than the temperature in the plastic pyrolysis process becomes oxidized and it also forms hydroperoxide. The formed hydroperoxide dispossesses hydrogen from the plastics when the temperature rises to the degree of the plastic pyrolyzing temperature. The reaction of this hydrogen disposition cuts plastic molecule chains and oligomoleculizes the molecules. By virtue of these facts, the present invention can accelerate the plastic pyrolysis process and can shorten the process time in comparison with the conventional existing process which depends only on the heating.

Furthermore, in the case that the unsaturated fatty acid oil containing the fatty ester is added as the additive, not only it can accelerate the process reaction, but also it can control the cutting of the plastic molecular chains. These facts make it possible for an operator to secure the quality of the oil products having narrow molecular weight distribution, and the products as recycle materials can be used without carrying out a further treatment.

Furthermore, in the case that a polymer is thermally decomposed through an oil treatment at a temperature that oligomoleculizes polymer molecules, a pyrolysate (material obtained by the thermal decomposition) includes light gas components, oil components that are liquid under the normal temperature, and residua. According to the present invention, the pyrolyzing temperature, however, can be lowered by adding the additive, i.e. 50 to 100° C. lower than the normal reaction temperature of the pyrolysis. According to such fact, the present invention will recommend that the temperature range of the pyrolysis should be 300° C. to 450° C. and more preferably, 330° C. to 400° C.

In addition, no limitation is imposed for selecting of any unsaturated fatty acid oil, for example, waste food oils like abandoned bean oils and fried oils can be good candidates. Furthermore, the additive (addition agent) made from the oils whose major components are waste food oils can be used. Further, in substitution for the unsaturated fatty acid oil, the heat-up oil oxide can be directly thrown into the pyrolyzing system as additive.

Furthermore, according to the present invention, the oxygen which is used to be a taboo can accelerate the pyrolysis by adding the additive. Acceleration of the hydroperoxide formation expedites the formation of radical which is originated in the hydroperoxide formation and also expedites the reaction of macromolecule decomposition which is more effective than the thermal decomposition. Therefore, the expediting oxidization of the additive can control and accelerate the reaction of the thermal decomposition.

In the present invention, a plastic chain is cut by the hydroperoxide which takes away oxygen from the plastic when the hydroperoxide is heated up to the temperature of the thermal decomposition of plastic. This is because the hydroperoxide is formed due to oxidization of the unstructured fatty acid glyceride included in the additive. The oxidizations occur, at the times of the oxidization and decomposition reactions under an organic acid metallic catalyzed condition, at the range of a temperature lower than the temperature of thermal decomposition of the plastic.

Furthermore, the present invention specifies the adding amount range of the additive since the pyrolysis reaction hardly occurs if few amount of the additive is added and also adversely influences high quality and low cost of the pyrolysate if a large quantity of the additive is added. Moreover, if the quantity of the additive of the unsaturated fatty acid oil is set within the limit of 20 to 50 weight %, it is possible to increase particularly the efficiency of the pyrolysis.

The iodine value is an index of the unsaturated fat level, which indicates the weight in grams of the iodine absorbed by the 100 grams of test sample. Since high degree unsaturated oil is easily oxidized and the thermal reaction of decomposition can be made easily and it can also expedite the pyrolysis, the present invention sets the value of 80 and more for the unsaturated fat iodine. It is preferable to use particularly the drying oil that has the iodine value of more than 100.

Furthermore, the present invention can provide a new way to attain the same quality of oilization that is realized in the existing oilization, this can be implemented by vaporizing and cooling the low boiling temperature components of the thermally decomposed plastics to the liquid temperature and recovering as fuel.

According to the present invention, either the substitution for oil asphalts or the additive for the oil asphalts can be recovered from either the liquid state or solid state of the heated and melted decompositions which are also recovered from a product of thermally dissolved plastics.

It is possible to shorten a process time and to achieve excellent quality by using the presently invented pyrolysis process for thermally decomposable asphaltization to the some extent by realizing the controlling of the molecular weight distribution through the pyrolysis reaction controlled with the hydroperoxide.

The present invention can thermally decompose not only the plastic but also the natural rubber, various kind of rubber represented by styrene-butadiene rubber (SBR), and other macromolecular materials. The present invention make it possible to decompose thermally the materials mentioned above without separating them. The existing oilization requires the separation by hands since those trashed materials are treated as foreign substances. However, for the purpose of getting the thermally decomposed oil product, it is foreseeable that sulfur contained in the rubber affects adversely to the thermal decomposition process. This means that the process is not optimal but feasible. For recycling the rubber, the existing procedure may be recommended because of its chemical property. However, the present invention does not set limits to the rubber recycling.

The pyrolysate obtained through the use of the thermal decomposition method and system described above, for example, can be recycled for substituting the asphalts, since the pyrolysate keeps the constant quality of the narrow range distribution of molecular weight, which does not require any treatment after the pyrolysis process.

The nature and further characteristic features of the present invention will be made more clear from the following descriptions made with reference to the accompanying drawings.

DESCRIPTION OF THE PREFERRED EMBODIMENTS

Preferred embodiments of the present invention will be described hereundere with reference to FIGS. 1 to 7 and Table 1.

Figure 1:
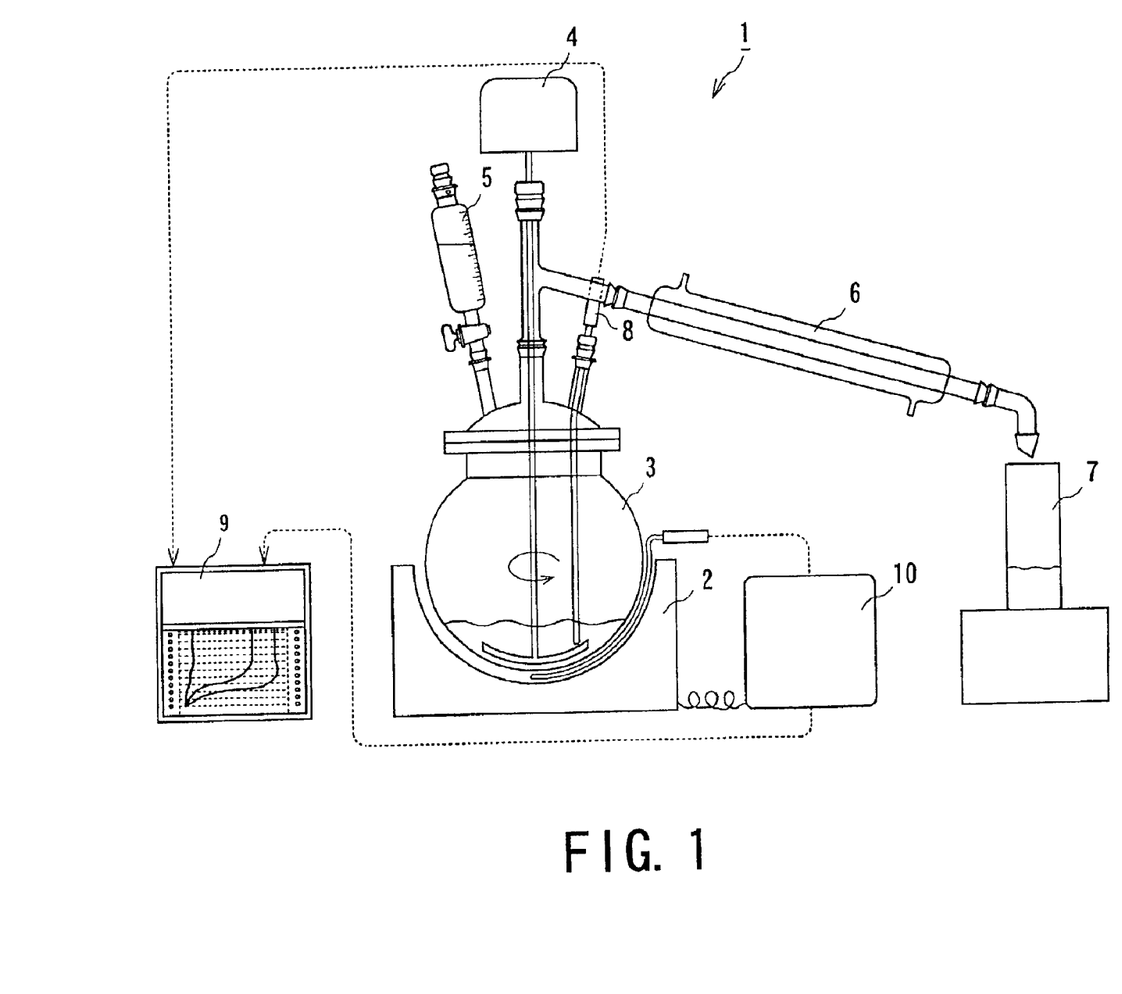
FIG. 1 illustrates an experimental apparatus for thermally decomposing (pyrolyzing) plastics according to a first embodiment of the present invention.

First Embodiment (FIG. 1, Table 1)

FIG. 1 represents an arrangement of an apparatus for experiment carrying out a first embodiment of the present invention.

With reference to FIG. 1, the apparatus 1 provided for an experiment comprises a pyrolysis vessel 3, a heater 2 arranged to the lower portion of the pyrolysis vessel 3, and an agitator 4 and an additive charging member 5 which are disposed, as viewed, above the pyrolysis vessel 3. A light fraction recovery vessel 7 is disposed at portion of a front end of a cooling pipe 6 connected to the pyrolysis vessel 3 so as to extend downward therefrom.

A temperature measuring device 8 is provided for the pyrolysis vessel 3 for measuring the temperature of a melted plastic, and the measured temperature is recorded by a temperature recorder 9 connected thereto. A temperature regulator 10 is connected to the heater 2 and the measured value from the temperature regulator 10 is inputted into the recorder 9 and recorded therein.

An additive (addition agent) had been mixed with the plastics outside the pyrolysis enclosure 3 before the charging into the vessel 3. The mixture was heated until it was equally melted and evenly mixed by using an agitator 4 to avoid a local heating of the mixture. After the heating process, the melted liquified mixture was heated up to the temperature of more than 350° C. and it was thermally decomposed.

Gas components generated by the heating are recovered as a light fraction into a light fraction recovery vessel 7 through the cooling pipe 6. Furthermore, it is required to pay an attention not to raise the heating temperature until the plastics has been completely melted during the pyrolysis process because the unequal thermal decomposition of plastic occurs in the pyrolysis vessel 3.

Using the experimental apparatus or facility 1 mentioned above, the pyrolysates obtained by the processes or method of the present invention or those of conventional technology were compared with each other.

EXPERIMENTAL EXAMPLE 200 g virgin pellets of acrylonitrile butadiene styrene prepared as plastics were charged into the pyrolysis vessel 3 with the 50 g of waste food fry oil which was added as an unsaturated fatty acid oil. After these plastic pellets and the food fry oil had been melted and mixed at the temperature range of 280–330° C. for 100 minutes, the pellets and oil were heated up to the temperature range of 350–370° C. and kept this condition for 60 minutes. A revolution speed of the agitator 4 was gradually increased, which had started at a rate of 10–100 rpm and went up to 300–1000 rpm, during the pyrolysis process for preventing unequal temperature distribution from occurring within the agitator 4. An atmospheric air containing oxygen was injected into the pyrolysis vessel 3 by using an air pump and the liquid in the vessel 3 was bubbled through the use of a bubbler.

CONVENTIONAL EXAMPLE

A conventional process was performed by substantially the same procedures except that, in this Example, no waste food fry oil of unsaturated fatty acid was added and the process time was 160 minutes.

The pyrolysates obtained were investigated for both the Experimental Example and Conventional Example through the measurements of a penetration degree and a soft point of the pyrolysates as to whether they are usable as substitute for an oil asphalts. The following Table 1 explains the results, in which the penetration degrees were results of the investigation under the temperature of 25° C. The measured penetration degrees and the soft points conformed with JIS (Japan Industrial Standard) K 2207.

TABLE 1

| Material | Additive (Catalyst) | Melting and Mixing Process | | Pyrolysis Process | | Pyrolysis | |
|---|---|---|---|---|---|---|---|
| | | Temp. (° C.) | Time (min) | Temp. (° C.) | Time (min) | Penetration Degree (° C.) | Softening (R&D) |
| D.E. ABS | food oil | 280~330 | 100 | 350~370 | 60 | more than 400 | less than 100 |
| E.E. ABS | (Waste) | N.A. | N.A. | 350~370 | 160 | 60 | 50~120 |

Legends
D.E.: Expelimental Example
E.E.: Conventional Example

From the Table 1, it will become clear that the pyrolysate obtained by the pyrolyzing (thermally decomposing) method of the present invention has the penetration degree of more than 400, which is far larger than the degree of 60 of the Conventional Example. It also becomes clear that the thus obtained pyrolysate (product) had a soft nature and its molecules were oligomoleculized.

It also becomes clear that the penetration degree was made large by increasing the processing time and by increasing the amount of the additive. Accordingly, it makes possible to obtain the pyrolysate with the penetration degree of 0 (zero) to more than 400.

According to the first embodiment, the pyrolysate obtained in the pyrolysis vessel 3 is a black colored object with the tar properties of adhesion and free flowing liquid, and this can be preferably used as a substitute for the oil asphalts.

Furthermore, in the described embodiment, although an acrylonitrile butadiene styrene resin was used, the plastic to be used for the recycling is not limited to this resin. For example, other thermoplastics such as polystyrene, polyolefin and polycarbonate, organic macromolecular materials represented by rubber, and furthermore, waste plastics mixed with these materials could be effectively utilized as material for attaining substantially the same effective results.

Figure 2:
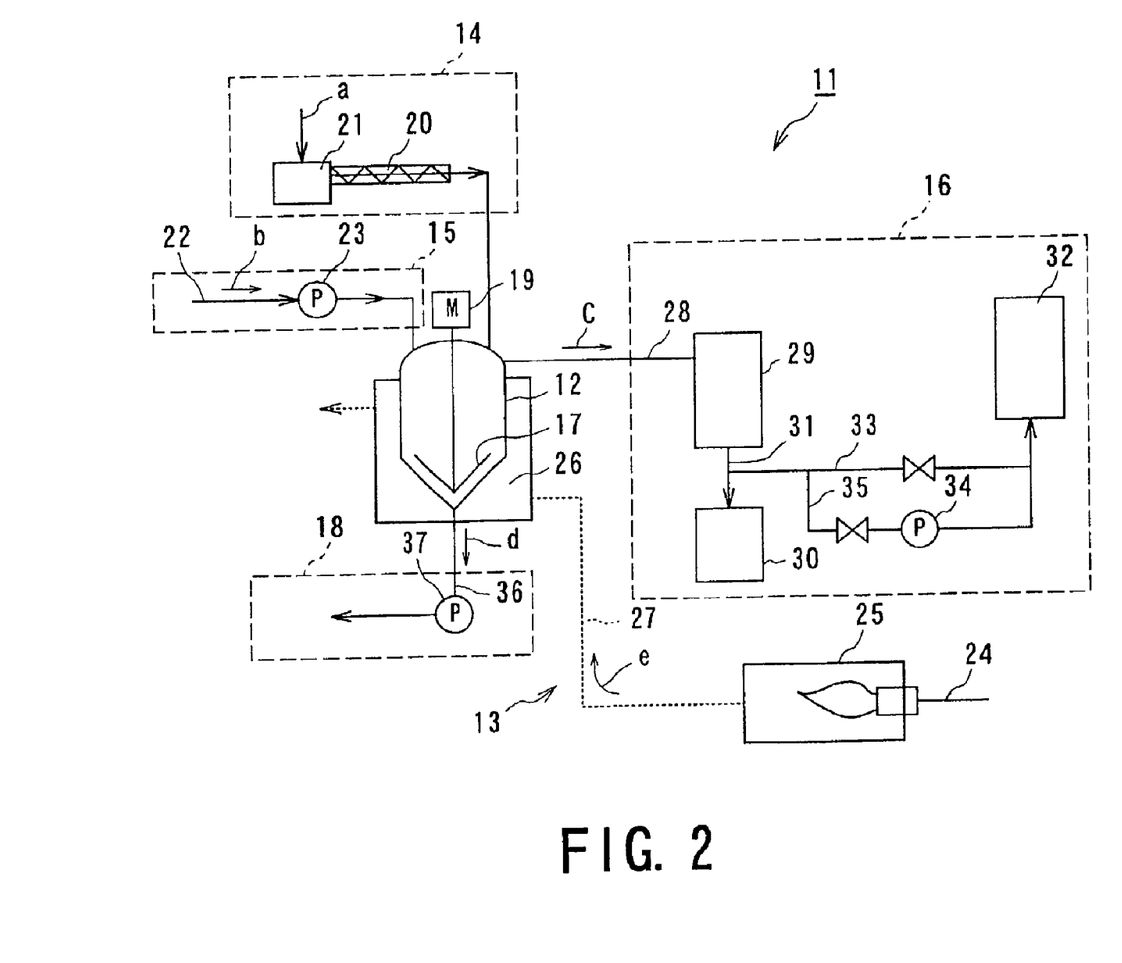
FIG. 2 is a flow diagram showing structure of a system for pyrolyzing plastics, for realizing the apparatus of FIG. 1, according to a second embodiment of the present invention, particularly of batch processing type, of the present invention.
Figure 3:
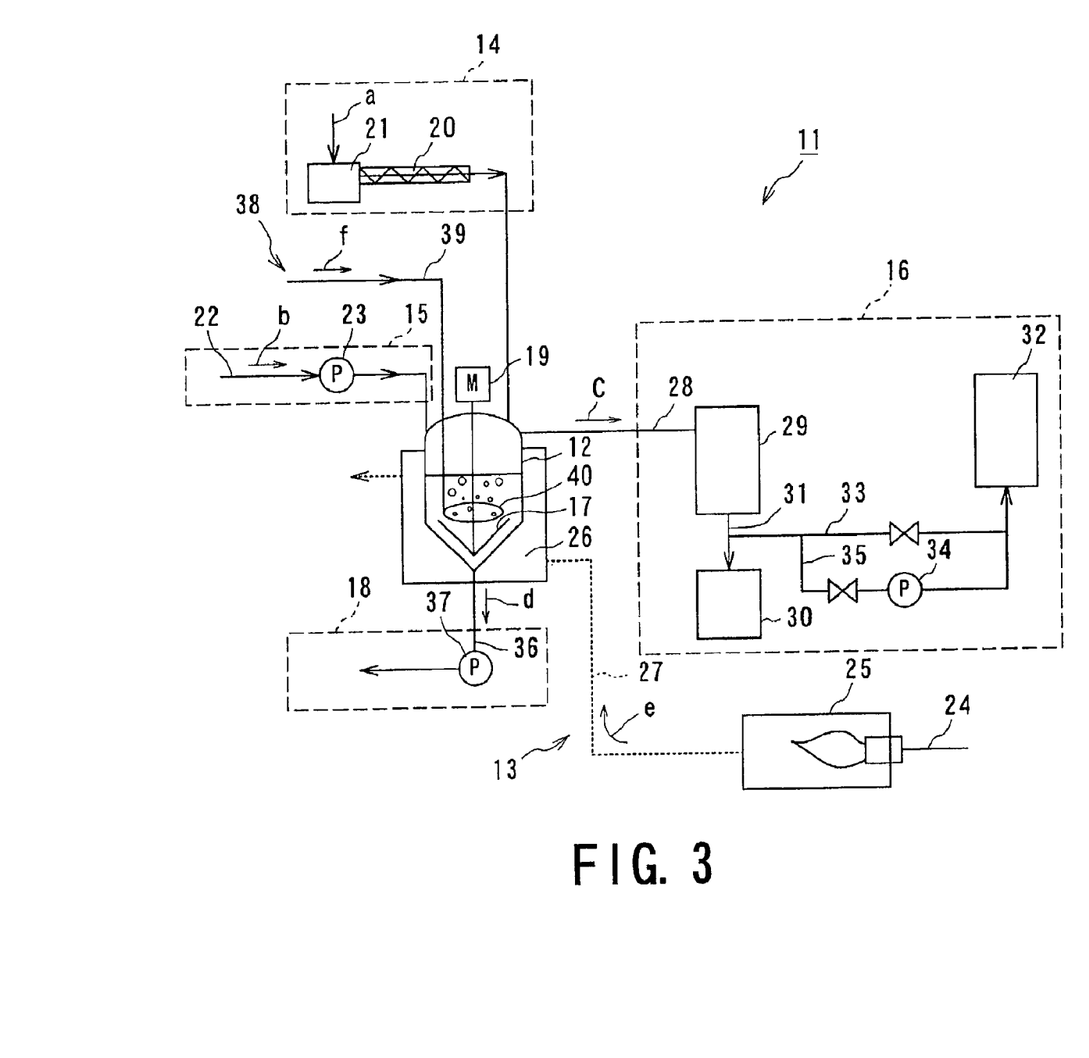
FIG. 3 is a flow diagram showing structure of a system for pyrolyzing plastics according to a modification of the apparatus of FIG. 2, in which the system is further provided with an (atmospheric) air supply means.

Second Embodiment (FIG. 2, FIG. 3)

The second embodiment shown in FIG. 2 and FIG. 3 is a plastic pyrolyzing system or apparatus which is a practical one representing the experimental apparatus of FIG. 1 as first embodiment.

With reference to FIG. 2, showing that the plastic pyrolysis (pyrolyzing) system 11 comprises a pyrolysis tank 12, which is heated by a heating means 13.

The system 11 further comprises a material charging means 14 that charges waste (disposed) plastics a into the pyrolysis tank 12, an additive charging or loading means 15 which charges an unsaturated fatty acid oil b into the pyrolysis tank 12 and a gas exhaust means 16 which exhausts a gas component c as by-product of a thermal process in the pyrolysis tank 12. These means are respectively installed at an upstream side in production of the pyrolysis tank 12.

On the other hand, a lower portion of the pyrolysis tank 12 is formed as funnel-shape, agitation blades 17 are located along a slope of the funnel-shaped bottom portion, and a pyrolysate discharger 18 through which a pyrolysate d derived through the pyrolysis process is disposed to the bottom portion of the pyrolysis tank 12. A rotary drive mechanism 19 rotating the agitation blades 17 is also disposed to the pyrolysis tank 12.

The material charging means 14 is equipped with a screw type feeder 20, a loader 21 connected to this screw type feeder 20 and a hopper, not shown, but located at the upper part of the loader 21. The waste plastic materials a relatively largely crushed are thrown into the pyrolysis tank 12 through a comparatively large and widely opened lid of the tank 12.

The additive charging means 15 is provided with an additive loading pipe 22 connected to the pyrolysis tank 12 and the unsaturated fatty acid oil b is charged as the additive. The additive charging means is also provided with a transfer pump 23 which is mounted to the additive loading pipe 22.

The heating means (heating source) 13 is equipped with a heating furnace 25 which burns a heavy oil (or kerosene) using a heating oil burner 24 and a heating device 26 disposed to the periphery of the pyrolysis tank 12. The heating furnace 25 is connected to the heating device 26 through a gas exhausting pipe arrangement 27. An exhausted gas e from the heating furnace 25 is supplied to the heating device 26.

The gas component exhaust means 16 is equipped with a gas component exhaust pipe arrangement 28 which discharges the gas component c from the pyrolysis tank 12 so that the gas component is generated as by-products of the pyrolysis and is also equipped with a condenser 29 connected to the gas component exhaust pipe arrangement 28. Furthermore, the condenser 29 is connected to a cooling pipe, not shown, a pipe arrangement 31 for an oil product recovery tank 30, which recovers oil products, and a pipe arrangement 33 connected to a gas processing unit 32. These pipes are arranged with a vacuum pump such as suction pump 34 and a bypass pipe arrangement 35 which bypasses the pumps.

The pyrolysate discharger 18 is equipped with a pyrolysate discharging pipe arrangement 36 connected to a lower portion of the pyrolysis tank 12 and a transfer pump 37 which transfers the pyrolysate to a tank, not shown, but provided for the pyrolysate discharging pipe arrangement 38.

The plastic pyrolyzing system 11 supplies the waste (once disposed) plastics a from the loader 21 to the pyrolysis tank 12 and, at the same time, a specified volume of the additive of the unsaturated fatty acid oil b is supplied to the pyrolysis tank 12. The waste plastics a and the additive b may be supplied in no particular order, and either one of them may be supplied first or both the same time.

A mixture of the waste plastics a and the unsaturated fatty acid oil b which are charged into the pyrolysis tank 12 are heated, melted and thermally decomposed with the heat provided by the heating means 13 under a condition of no oxygen (or very few oxygen). The pyrolysis process oligo-moleculizes the disposed plastics a and obtains the pyrolysate d as an asphalt components by means of cyclization, and the pyrolysate d is discharged through the pyrolysate discharger 18. On the other hand, low boiling point components, which are by-products of the pyrolysis reaction, are recovered as the gas component c through the gas component exhaust equipment 16. Furthermore, oil products, not shown in the FIG. 2, which are recovered and stored in the oil product recovery tank 30 which is provided for the gas component exhaust equipment 16, can be used as heating resource by being supplied to the heating means 13.

FIG. 3 shows another plastic pyrolyzing system of the present invention, which is similar to that of FIG. 2 except that an (atmospheric) air supply unit 38 is additionally equipped to the pyrolysis tank 12 shown in the FIG. 2 for supplying (atmospheric) air f to the tank 12.

The air supply unit 38 is equipped with an air supply pipe arrangement 39 and a bubbler 40, having an annular ring shape, for example, attached to a front end of the air supply pipe 39. The bubbling of melted liquid and blowing oxygen on the surface of the melted liquid, although not shown in the figure, stimulates the oxidization. The blowing of the gas including oxygen is not limited to the described method and many other methods or means would be taken as far as the oxygen is supplied. In addition, the gas volume monitoring is required for preventing combustion reaction and explosion due to the over-supply of the oxygen.

According to this second embodiment, since the pyrolysate discharger 18 is disposed below the pyrolysis tank 12, it becomes possible to increase processing volume of the pyrolysate d per unit time in the case of industrial use and to reduce the costs of mass-production while a safety operation being guaranteed.

Furthermore, according to this second embodiment, an amount of the material to be charged into the pyrolysis vessel 12 is constant and the amount of the material to be treated at one time for the process is limited. However, by introducing of the additive such as unsaturated fatty acid oil b to the pyrolysis system, a time required for the decomposition can be made short, and the treating amount of the material can be increased and treating ability can be also improved in comparison with the conventional existing system and method. Moreover, since in the described embodiment, the charge is not performed continuously, it becomes easy to stop or start the operation of the plastic pyrolyzing system 11 even in a case of accident, for example, of pipes being clogged with some obstacles.

Still furthermore, the second embodiment does not specify the kind of waste plastic a. For example, however, general-purpose plastics such as PE (polyethylene), PP (polypropylene), PS (polystyrene), PVC (polyvinyl chloride), copolymerization plastics such as ABS (acrylonitrile butadiene styrene), and one kind rubber or several kinds of rubbers like diene group can be used as the disposed plastics a. Any plastic mentioned above can be mixed with other plastics and can be supplied to the system or process.

Third Embodiment (FIG. 4 to FIG. 7)

Figure 4:
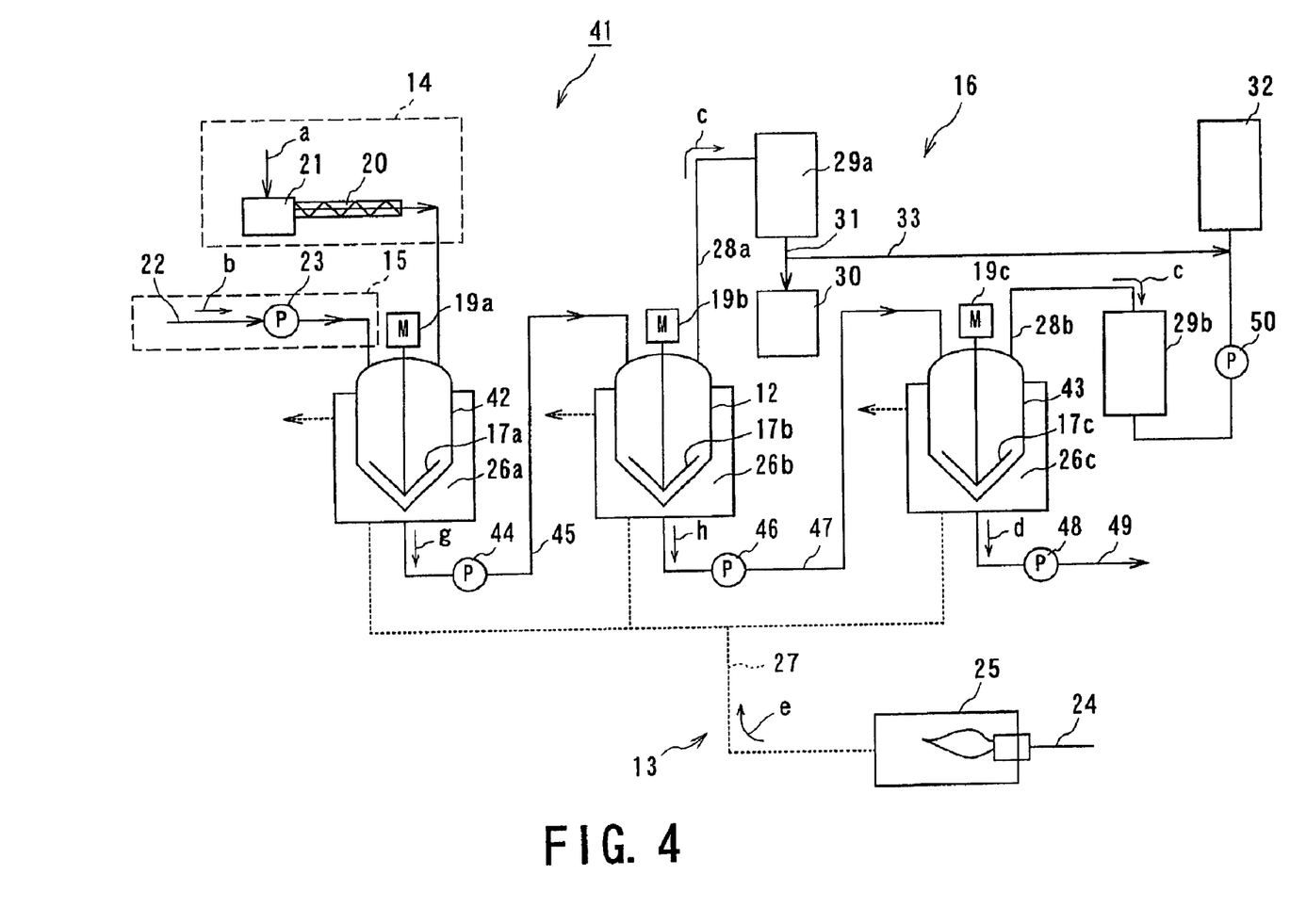
FIG. 4 illustrates a flow diagram showing structure of a system for pyrolyzing plastics, particularly of continuous additive charging type, according to a third embodiment of the present invention.
Figure 5:
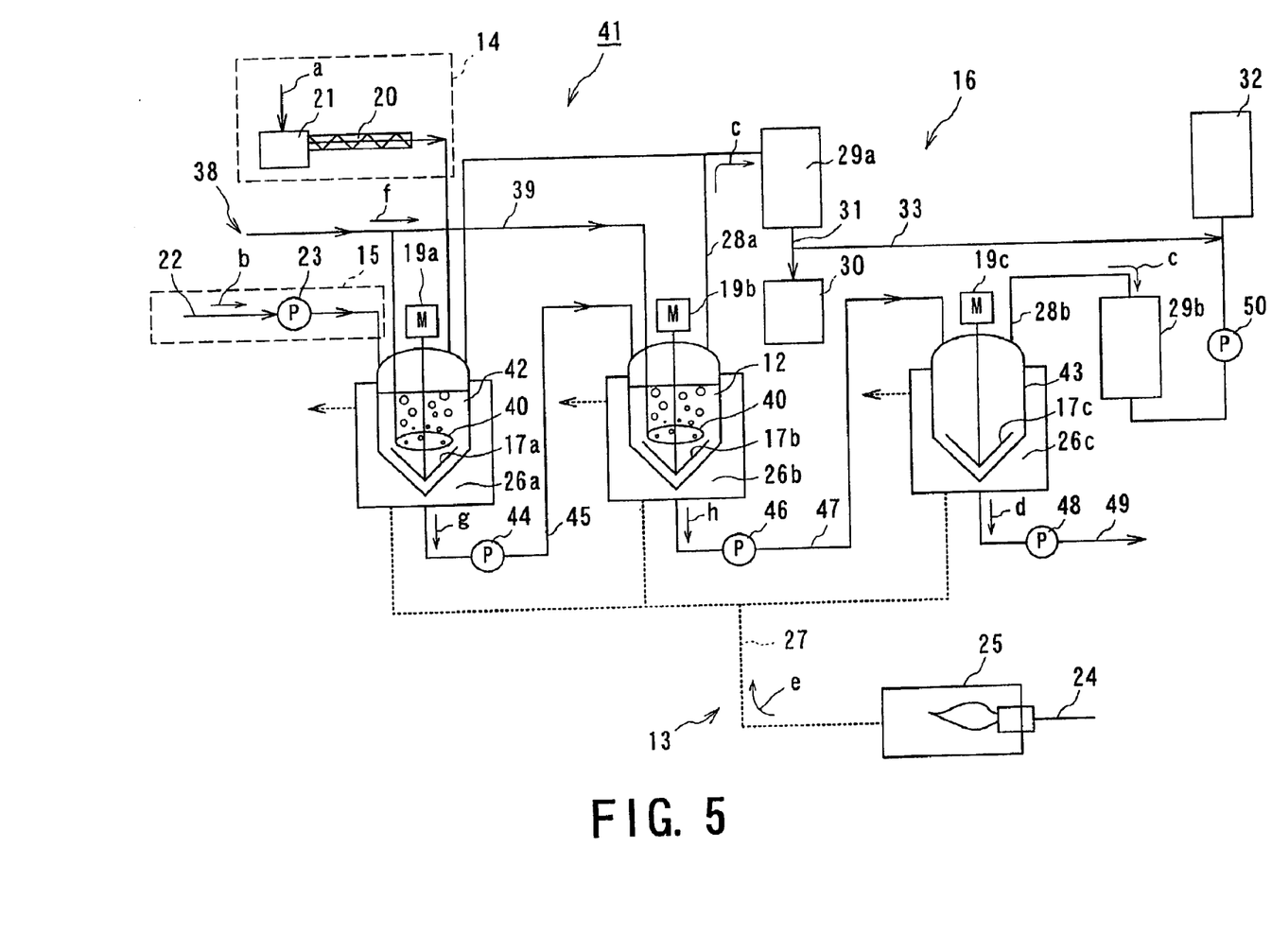
FIG. 5 is a flow diagram showing structure of a system for pyrolyzing plastics according to a modification of the system of FIG. 4, in which the system is further provided with an (atmospheric) air supply means.

The third embodiment of the present invention will be first explained hereunder with reference to FIG. 4 and FIG. 5, representing a system carrying out continuously a plastic pyrolyzing (thermally decomposing) system, which continuously produces a pyrolysate. A modified example of such system is also explained with reference to FIG. 6 and FIG. 7.

A plastic thermal decomposition system 41 of FIG. 4 is equipped with a melting and mixing tank 42 at an upstream side, in operation, of the pyrolysis tank 12 and an evaporator 43 at a downstream side thereof. Like reference numerals or symbols used in FIG. 2 are used for showing the same positions and/or members and duplicated explanation thereof is hence omitted herein.

The melting and mixing tank 42 has, as shown in the FIG. 4, a gas-tight structure which is substantially the same as the pyrolysis tank 12 shown in the FIG. 2 and decomposes thermally the plastics. A heating device 26a is provided around the melting and mixing tank 42 and the heating device 26a is connected to the heating means 13. The material charging means 14, the additive loading means 15, and the gas component exhaust means 16 are located on the upstream side (upper position as viewed) on the melting and mixing tank 42. A melted material transfer pipe arrangement 45 equipped with a pump 44 which transfers the melted materials g to the pyrolysis tank 12 is connected to the lower portion of the melting and mixing tank 42.

The pyrolysis tank 12 has substantially the same tank structure as that of the melting and mixing tank 42 and acts to thermally decompose the melted plastics. A heating device 26b is further disposed around the pyrolysis tank 12 and connected to the heating means 13. The gas component exhausting pipe arrangement 28a exhausts the by-product gas components c to the gas component exhaust means 16 and is connected to the upper portion of the pyrolysis tank 12. This gas component exhausting pipe arrangement 28a is also connected to the condenser 29a. A pyrolysate transfer pipe arrangement 47 equipped with a pump 46 which transfers a pyrolysis products h generated through the pyrolysis operation is connected to the lower bottom) portion of the pyrolysis tank 12.

The evaporator (evaporation tank) 43 has a structure similar to that of the melting and mixing tank 42 and distils low boiling components derived from the materials in the process of resolving within the pyrolysis tank 12 through the heating and evaporating of the components. A heating device 26c is provided around the evaporator 43 and this heating device 26c is also connected to the heating means 13.

The gas component exhausting pipe arrangement 28b, which exhausts the gas components c of the by-products of the heating and is transferred to the gas component exhaust means 16, is connected to the upper portion (upstream side) of the evaporator 43 and to the condenser 29b. After the gas component c are induced into the condenser 29b, the pump 50 supplies the gas components c to the gas processing unit 32. The pyrolysate product transfer pipe arrangement 49, which is equipped with the pump 48 exhausting the pyrolysate d after the gas components c has been excluded through the evaporation, is connected to the lower portion of the evaporator 43.

The melting and mixing tank 42, the pyrolysis tank 12 and the evaporator 43 are all provided with a funnel-shaped bottom (lower portion), as viewed, and agitation blades 17a, 17b, and 17c are arranged along the slops of the funnel shapes thereof. The rotary drive mechanisms 19a, 19b and 19c such as the electric motors or like, which drive the agitation blades 17a, 17s, and 17c, are respectively provided for the melting and mixing tank 42, the pyrolysis tank 12 and the evaporator 43.

According to the structure of the plastic thermal decomposition (pyrolyzing) system 41 described above, the loader 21 supplies the specified amount of disposed (waste) plastic a to the melting and mixing tank 42 and, at the same time, the transfer pump 23 is operated to supply, as an additive, the specified amount of unsaturated fatty acid oil b to the pyrolysis tank 12. After the mixed materials of the thus disposed plastics a and the unsaturated fatty acid oil b are charged and melted together in the melting and mixing tank 42, a produced molten product is transferred to the pyrolysis tank 12. The molten product is then heated, through the use of the heating means 13 for applying heat, melted and thermally decomposed under the presence of few oxygen (or no oxygen. As a result of the thermal reaction, the disposed plastics a synthesize the pyrolysis product h through the reactions of oligomoleculization and cyclization. The synthesized product is then induced into the evaporator 43. The induced pyrolysis product h is further heated within the evaporator 43 and the low boiling components obtained as by-products are recovered as the gas components c and induced into the gas component exhaust means 16. The pyrolysate d is discharged through the pyrolysate product transfer pipe arrangement 49, which is located downstream side of the evaporator 43.

FIG. 5 represents another example of the system 41 shown in FIG. 4, which is additionally equipped with an atmospheric (air) supply means 38 for supplying the air to the melting and mixing tank 42 and the pyrolysis tank 12 and the other structure is substantially the same as that of FIG. 4.

Figure 6:
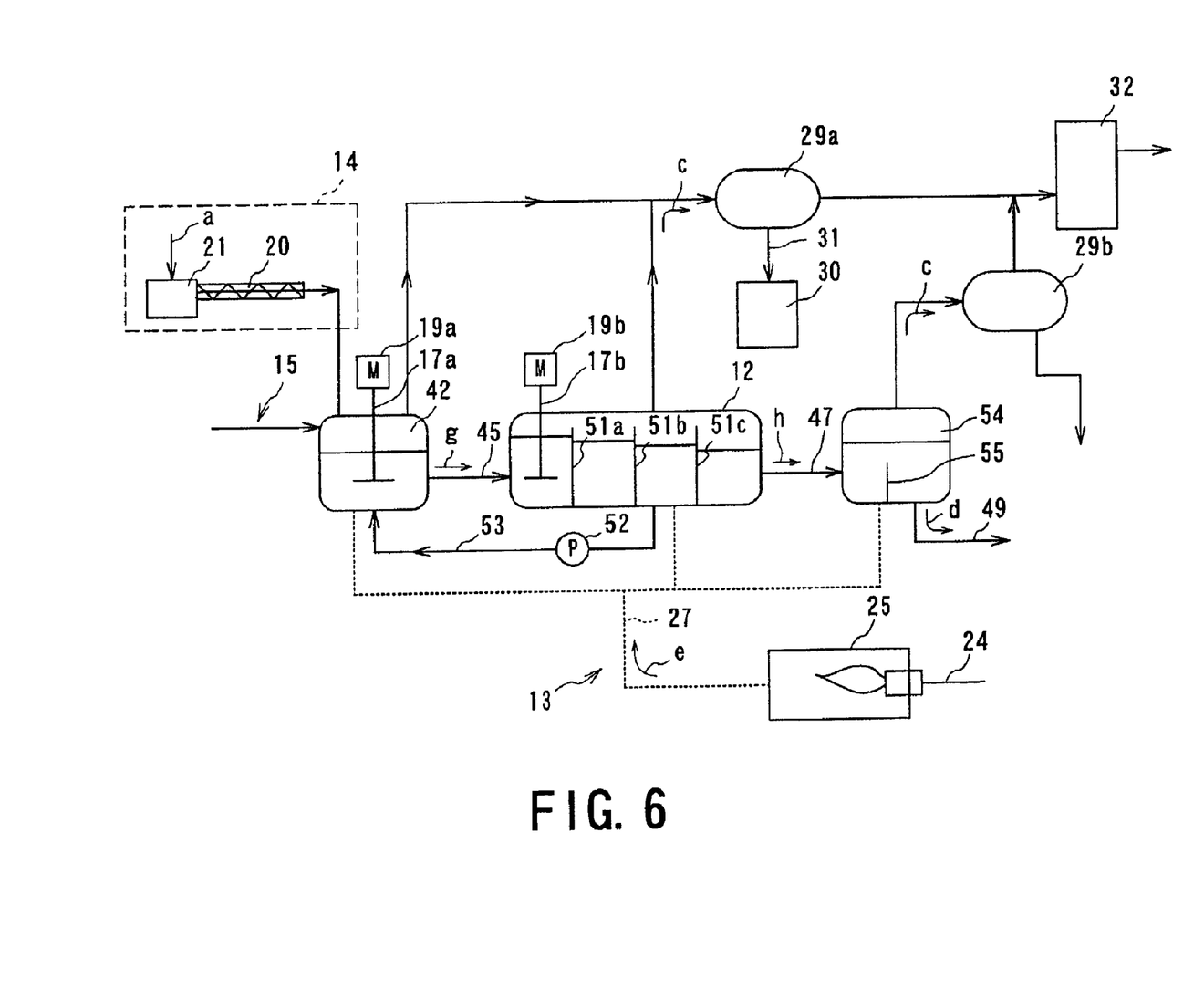
FIG. 6 illustrates a flow diagram showing structure of a modified system of FIG. 4 provided with thermal decomposition tank and evaporator.
Figure 7:
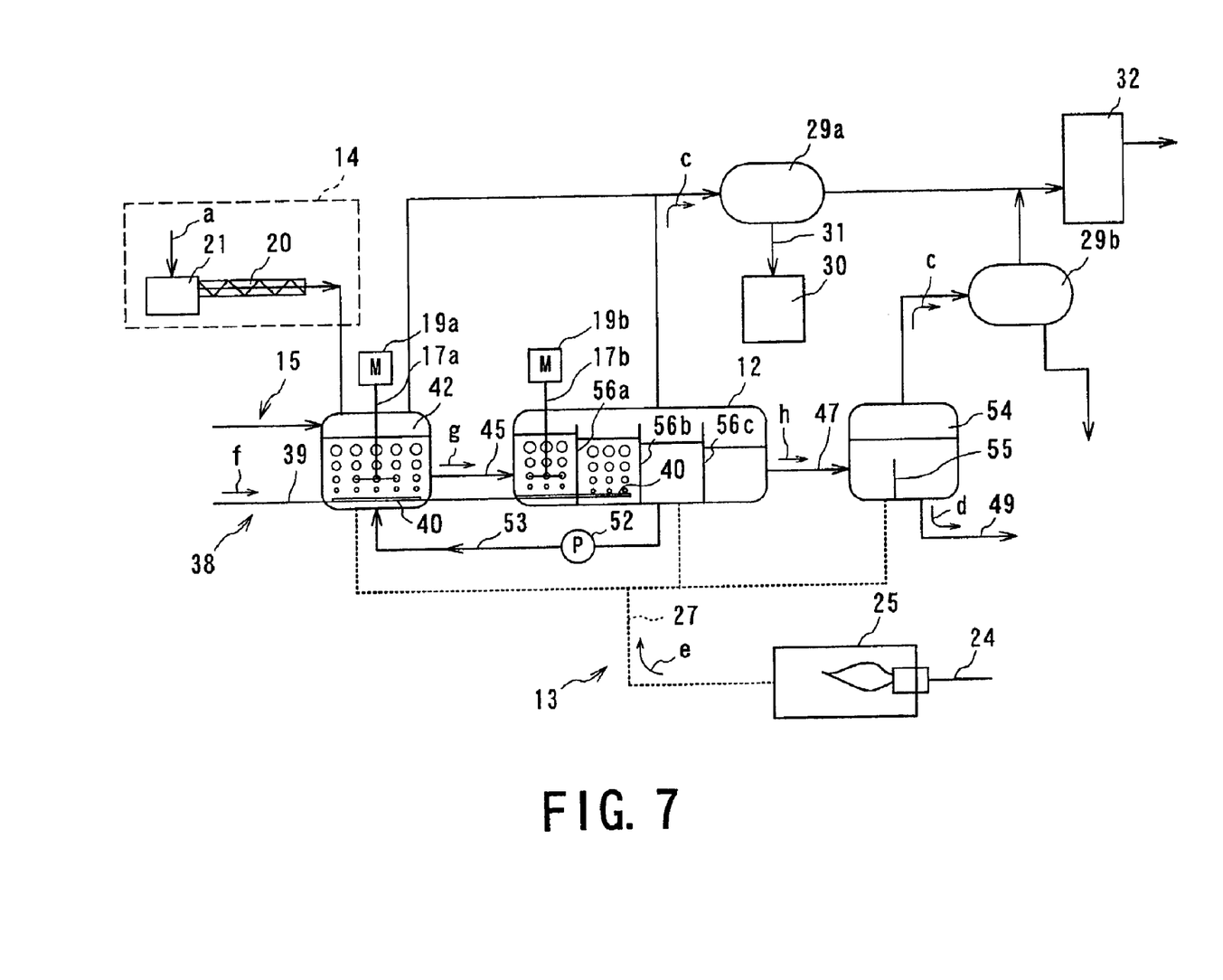
FIG. 7 is a flow diagram showing structure of a system for pyrolyzing plastics according to a modification of the system of FIG. 6, in which the system is further provided with an (atmospheric) air supply means.

Next, FIG. 6 and FIG. 7 show a modified example of the plastic pyrolyzing (thermally decomposing) system, in which FIG. 6 shows practically the same configuration of the plastic thermal decomposition system of FIG. 4 except that modification is added to the pyrolysis tank 12 and the evaporator 43 shown in FIG. 4.

With reference to FIG. 6, three partition (sectioning) members 51a, 51b and 51c are disposed within the pyrolysis tank 12 so as to divide the interior of the pyrolysis tank 12 into four sections. The upper end portions of these partition members 51a, 51b and 51c are alternately opened so that the liquid can flow, from one partition member 51a to another partition member 51b and from this partition member 51b to the further partition member 51c, in the zigzag form constituting an S style outflow. A pipe arrangement 53, which is connected to the melting and mixing tank 42 equipped with the pump 52, is connected to the bottom portion between the partition members 51b and 51c.

This embodiment is provided with a stripping tank 54 in which one partition member 55 is disposed, the stripping tank 54 corresponding to the evaporator 43 in FIG. 4.

FIG. 7 represent an example in which the air supply means 38 for supplying the atmospheric air f into the melting and mixing tank 42 and the pyrolysis tank 12 is arranged in the system of FIG. 6.

The air supply means 38 is equipped with the air supply pipe arrangement 39 and also equipped with the bubbler 40 at the lower portions in the melting and mixing tank 42 and the pyrolysis tank 12.

In the embodiment of FIG. 7, partition members 56a, 56b and 56c are disposed in the pyrolysis tank 12 of the pyrolyzing system.

Furthermore, in this third embodiment, the melting and mixing tank 42, which works as another tank at a different heating temperature from the temperature of the pyrolysis tank 12, is disposed on the upstream side of the pyrolysis tank 12 such as shown in FIG. 4 and FIG. 5. Therefore, the substantially increased volume of the disposed plastics a can be processed because the disposed plastics can be continuously charged and thermally decomposed after the melting process.

Moreover, even in the case that the air supply means 38 is not installed as shown in FIG. 4 or FIG. 6, it is possible to accelerate and control the pyrolysis reaction. However, the additional location of the air supply means 38, which supplies the atmospheric air f to the pyrolysis tank 12 and the melting and mixing tank 42, helps substantially to accelerate and control the pyrolysis reaction.

Furthermore, in the described embodiment, although the partition members 51a, 51b and 51c are arranged in the pyrolysis tank 12 and the stripping tank 54, more than three partition members may be arranged and the location number thereof is not limited to the example of the third embodiment.

Consequently, the third embodiment demonstrates that it is possible to recycle effectively the pyrolysate and the waste plastics that consists primarily of the thermoplastic i.e. acrylonitrile butadiene styrene resin, polystyrene, polyolefin, and polycarbonate, and also macromolecular materials represented by rubbers, and furthermore, the waste plastics being mixed with the plastics and the rubbers mentioned above. It is also effective to perform the thermal decomposition and oligomoleculization under the conditions of heating and mixing the unsaturated fatty acid oil or the heated unsaturated fatty acid oil oxide with the waste plastics.

It is further noted that the present invention is not limited to the described embodiment and many other changes and modifications may be made without departing from the scopes of the appended claims.

What is claimed is:

1. A method of pyrolyzing a plastic, comprising:
    preparing a mixture of a plastic as material to be treated and an unsaturated fatty acid oil;
    heating the mixture at a temperature of 300° C. to 450° C. to thereby thermally decompose the mixture; and
    removing a gas component produced in the heating process of the plastic.

2. A method of pyrolyzing a plastic according to claim 1, further comprising
    melting the mixture before said heating at a temperature lower than said temperature for the thermal decomposition by 50° C. to 100° C.

3. A method of pyrolyzing a plastic according to claim 2, further comprising:
    blowing an oxygen or a gas including an oxygen into the plastic in a melted state.

4. A method of pyrolyzing a plastic according to claim 2, wherein at least one agent for accelerating an oxidation selected from the group consisting of a metal salt naphthenate, a metal salt fatty acid and a metal salt organic acid is added during said thermally decomposing step or melting step.

5. A method of pyrolyzing a plastic according to claim 2, wherein a pyrolysate in liquid or solid state obtained through the thermally decomposing process or melting process is recovered as a substitution for oil asphalts or as an additive to oil asphalts.

6. A method of pyrolyzing a plastic material according to claim 1, wherein the unsaturated fatty acid oil is added by 5–100 weight % with respect to the plastic material of 100 wt. %.

7. A method of pyrolyzing a plastic according to claim 6, wherein the unsaturated fatty acid oil has an iodine value of more than 80.

8. A method of pyrolyzing a plastic according to claim 1, wherein the gas component generated at the gas component removing process is cooled and liquified to thereby recover the gas component as fuel oil.

9. A method of pyrolyzing a plastic according to claim 1, wherein a natural rubber, a synthetic rubber or another organic macromolecule is used as a material other than the plastic.

10. A pyrolysate manufactured by the method of pyrolyzing a plastic of claim 1.

11. The method as claimed in claim 1, further comprising: condensing the gas component to form an oil-asphalt pyrolysate.

12. The method as claimed in claim 1, wherein the gas component has a molecular-weight distribution in the range of 2,000 to 10,000.

13. The method of claim 1, wherein the heating includes oxidizing the mixture and forming a hydroperoxide.

14. A system for pyrolyzing a plastic comprising:
a pyrolysis tank;
a material charging means for charging a plastic as material to be treated into the pyrolysis tank;
a supply means for supplying an unsaturated fatty acid oil to the pyrolysis tank;
a heating means for heating the pyrolysis tank; and
a gas component removing means for removing a gas component generated during the heating from the pyrolysis tank.

15. A system for pyrolyzing a plastic according to claim 14, further comprising an air supply means for blowing oxygen or a gas containing oxygen into a liquid phase of a melted product and a pyrolysate in the pyrolysis tank and the melting and mixing tank.

16. A system for pyrolyzing a plastic comprising:
a melting and mixing tank;
a material charging means for charging a plastic as a material to be treated into the melting and mixing tank;
a supply means for supplying an unsaturated fatty acid oil to the melting and mixing tank, in which the plastic and the unsaturated fatty acid oil are melted and mixed;
a pyrolysis tank for thermally decomposing a melted product fed from the melting and mixing tank;
an evaporator provided for removing a gas component of the thermally decomposed pyrolysate induced from the pyrolysis tank;
a heating means for heating the melting and mixing tank, the pyrolysis tank, and the evaporator; and
a discharging means for removing and discharging the gas component generated through the heating process.

17. A system for pyrolyzing a plastic according to claim 16, further comprising an air supply means for blowing oxygen or a gas containing oxygen into a liquid phase of a melted product and a pyrolysate in the pyrolysis tank and the melting and mixing tank.

18. A method of pyrolyzing a plastic material, comprising:
preparing a mixture of a plastic material to be treated and an unsaturated fatty acid oil of an amount of 5–100 wt. % with respect to the plastic material of 100 wt. %;
heating the mixture to a temperature of from 350–450° C. to thereby thermally decompose the mixture; and
removing a gas component produced in the heating of the plastic material.

19. The method of pyrolyzing a plastic according to claim 18, further comprising:
melting the mixture before said heating at a temperature lower than said temperature for the thermal decomposition by 50° C. to 100° C.

20. A method of pyrolyzing a plastic according to claim 19, wherein a pyrolysate in liquid or solid state obtained through the thermally decomposing process or melting process is recovered as a substitution for oil asphalts or as an additive to oil asphalts.

21. A method of pyrolyzing a plastic according to claim 19, further comprising:
blowing an oxygen or a gas including an oxygen into the plastic in a melted state.

22. A method of pyrolyzing a plastic according to claim 19, wherein at least one agent for accelerating an oxidation selected from the group consisting of a metal salt naphthenate, a metal salt fatty acid and a metal salt organic acid is added during said thermally decomposing step or melting step.

23. The method of pyrolyzing a plastic according to claim 18, wherein the unsaturated fatty acid oil has an iodine value of more than 80.

24. The method of pyrolyzing a plastic according to claim 18, wherein the gas component generated at the gas component removing process is cooled and liquified to thereby recover the gas component as fuel oil.

25. A method of pyrolyzing a plastic according to claim 18, wherein a natural rubber, a synthetic rubber or another organic macromolecule is used as a material other than the plastic.

26. A pyrolysate manufactured by the method of pyrolyzing a plastic of claim 18.

* * * * *